United States Patent
Hirose

(10) Patent No.: US 11,995,366 B2
(45) Date of Patent: May 28, 2024

(54) SERVER PERFORMS A REGISTRATION OPERATION FOR A PLURALITY OF PRINTERS USING PRINTER IDENTIFICATION INFORMATION, RECEIVES CORRESPONDENCE KEY INFORMATION FROM A TERMINAL DEVICE AND NON-TRANSITORY COMPUTER-READABLE STORAGE MEDIUM

(71) Applicant: BROTHER KOGYO KABUSHIKI KAISHA, Nagoya (JP)

(72) Inventor: Kasumi Hirose, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/191,087

(22) Filed: Mar. 28, 2023

(65) Prior Publication Data
US 2023/0315368 A1     Oct. 5, 2023

(30) Foreign Application Priority Data
Apr. 1, 2022   (JP) .................. 2022-062158

(51) Int. Cl.
*G06F 3/12*     (2006.01)
*H04W 12/0433*  (2021.01)

(52) U.S. Cl.
CPC .......... *G06F 3/1288* (2013.01); *G06F 3/1204* (2013.01); *G06F 3/1238* (2013.01); *H04W 12/0433* (2021.01)

(58) Field of Classification Search
None
See application file for complete search history.

(56) References Cited

U.S. PATENT DOCUMENTS 7,148,980 B2 *  12/2006  Tominaga ............. G06F 3/1236
                                                     358/1.14
2007/0282995 A1  12/2007  Mizuno et al.
2014/0282996 A1   9/2014  Mori
(Continued)

FOREIGN PATENT DOCUMENTS

JP     2014-178984 A    9/2014

OTHER PUBLICATIONS

Extended European Search Report dated Aug. 28, 2023 from related EP 23164332.1.

*Primary Examiner* — Haris Sabah
(74) *Attorney, Agent, or Firm* — Scully, Scott, Murphy & Presser, PC

(57) ABSTRACT

A server includes a controller configured to receive a plurality of pieces of device identification information from a communication device, each of the plurality of pieces of device identification information indicating a device to be used for receiving a specific service, record the plurality of pieces of device identification information and one piece of correspondence information in a memory in association with each other, receive the correspondence information from a terminal device of a user, and execute, in response to the reception of the correspondence information, specific processing related to the specific service using the plurality of pieces of device identification information associated with the correspondence information.

10 Claims, 8 Drawing Sheets

(56) References Cited

U.S. PATENT DOCUMENTS

| | | | |
|---|---|---|---|
| 2015/0092233 A1* | 4/2015 | Park | H04N 1/00244 |
| | | | 358/1.15 |
| 2016/0239246 A9 | 8/2016 | Takano | |
| 2017/0230346 A1* | 8/2017 | Fujii | G06F 11/00 |
| 2019/0268336 A1* | 8/2019 | Gomi | H04W 12/069 |
| 2020/0285423 A1* | 9/2020 | Annamalai Thangaraj | |
| | | | G06F 3/1258 |
| 2021/0240424 A1 | 8/2021 | Yasuda | |

* cited by examiner

FIG. 2

MANAGEMENT TABLE ~TB

DEVICE LIST LT ~LT1, ~LT2, ~LT3

| DEVICE ID | PRINTER INFORMATION (MODEL NAME, etc.) |
|---|---|
| PRID_A | PRINTER A, ⋯ |
| PRID_B | PRINTER B, ⋯ |
| PRID_C | PRINTER C, ⋯ |
| PRID_D | PRINTER D, ⋯ |
| PRID_E | PRINTER E, ⋯ |

REGISTRATION KEY TABLE KT ~KT

| REGISTRATION KEY | DEVICE LIST | STATUS |
|---|---|---|
| KY_1 | LT1 | RECEIVED |
| KY_2 | LT2 | RECEIVED |
| TK_3 | LT3 | UNRECEIVED |

ACCOUNT TABLE AT ~AT

| ACCOUNT ID | PASSWORD | USER NAME |
|---|---|---|
| AC_a | PW_a | KEN |
| AC_c | PW_c | ALICE |

DEVICE REGISTRATION TABLE DT ~DT

| ACCOUNT ID | DEVICE LIST |
|---|---|
| AC_a | LT1 |
| AC_c | LT2 |

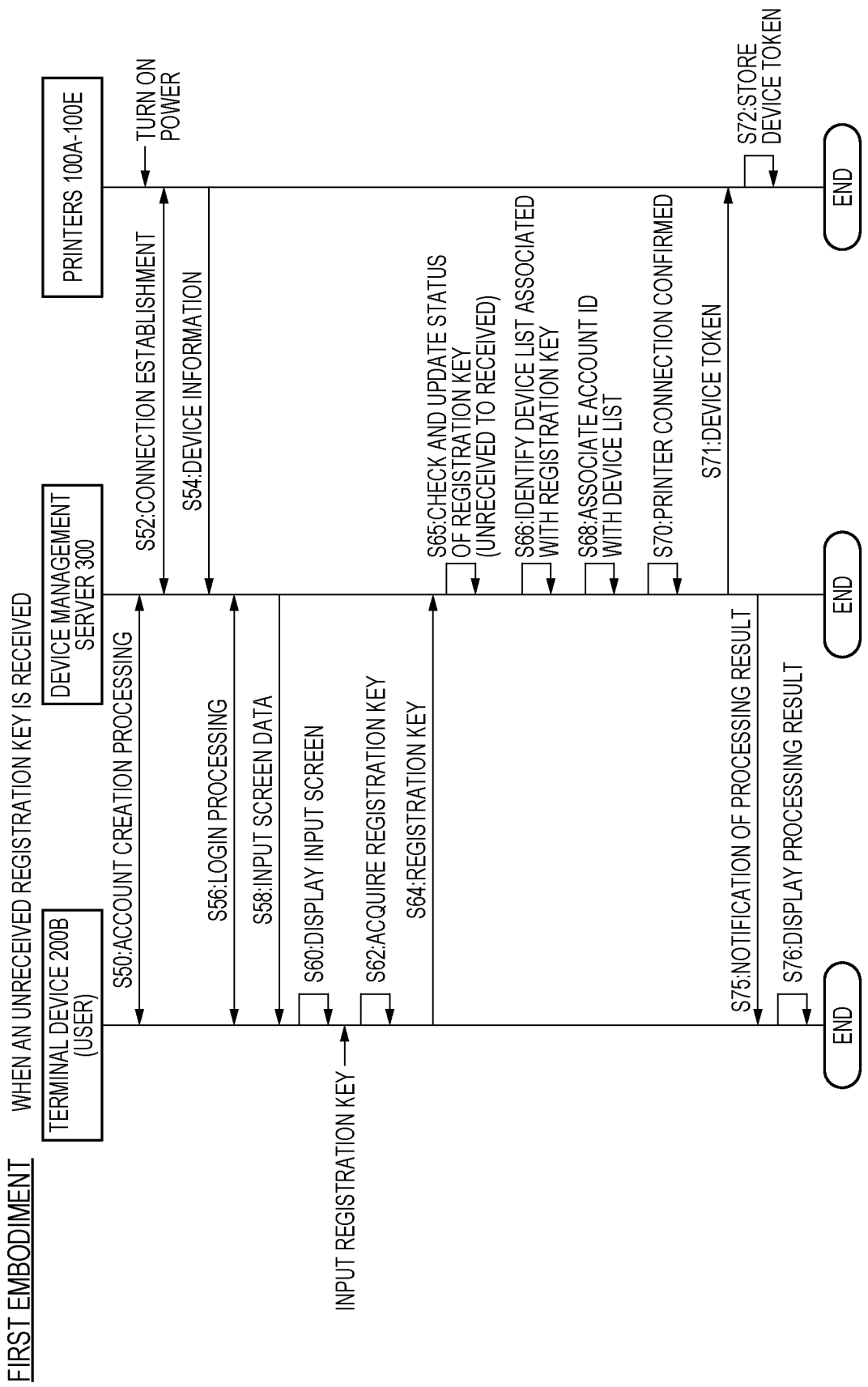

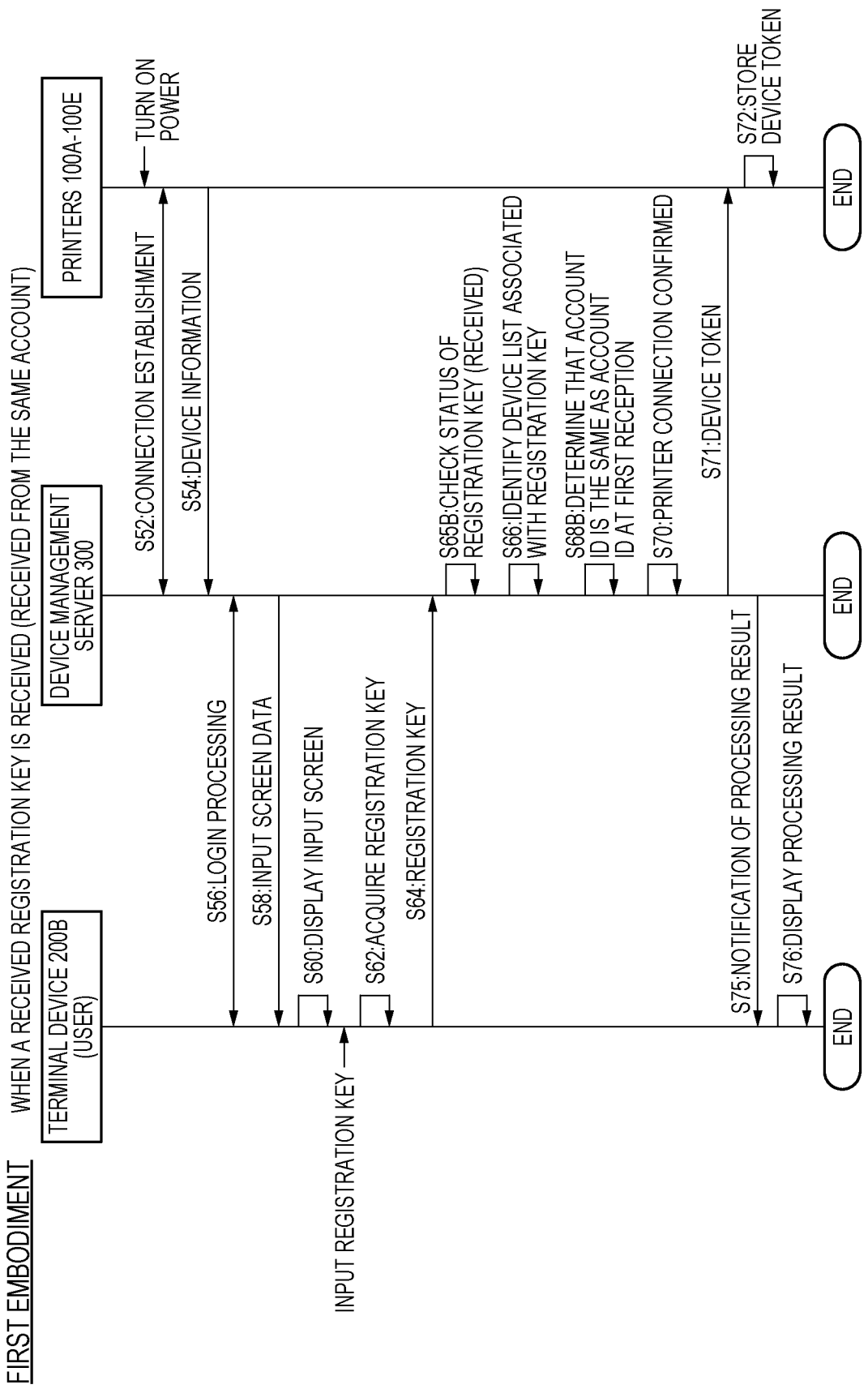

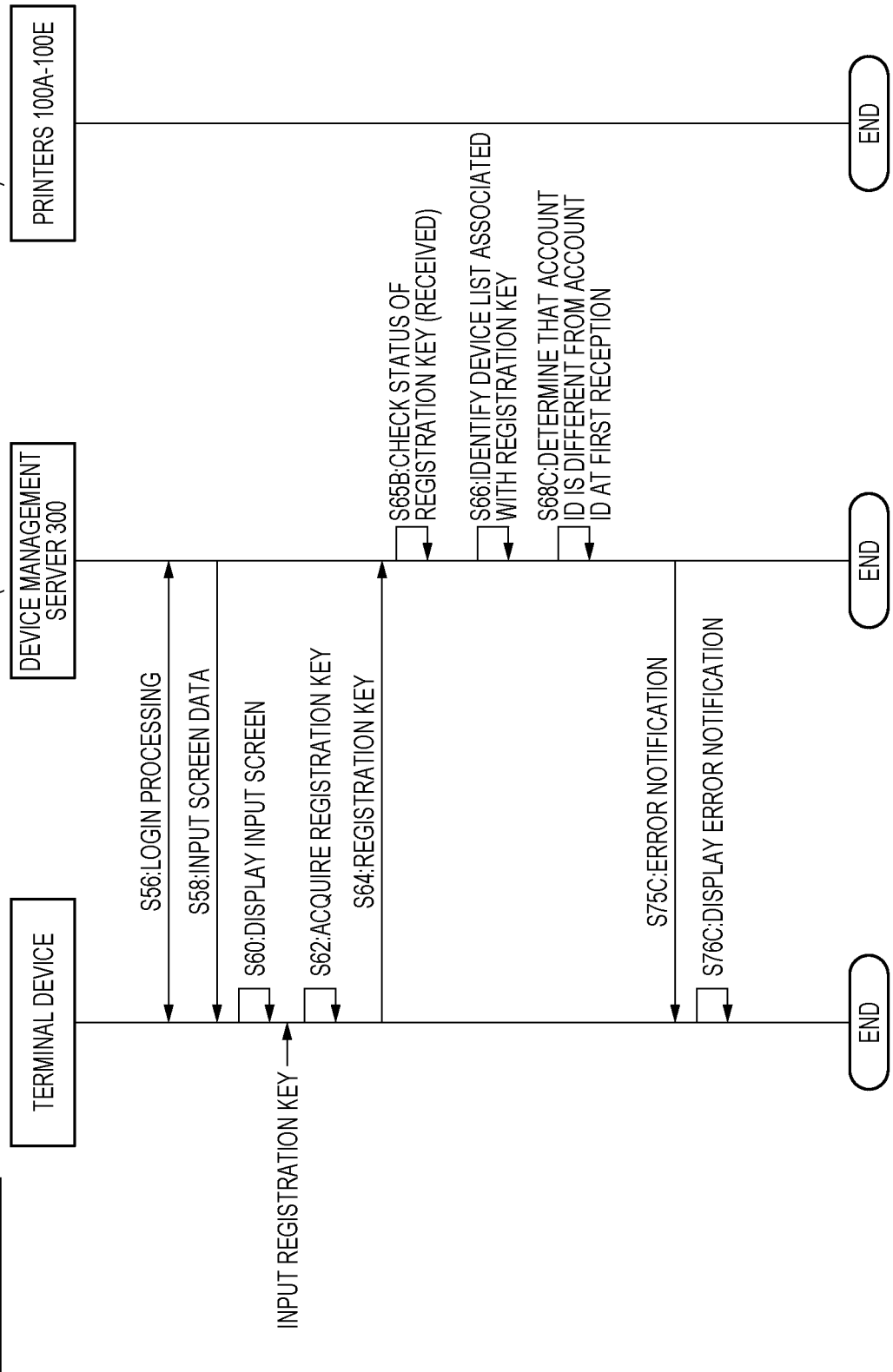

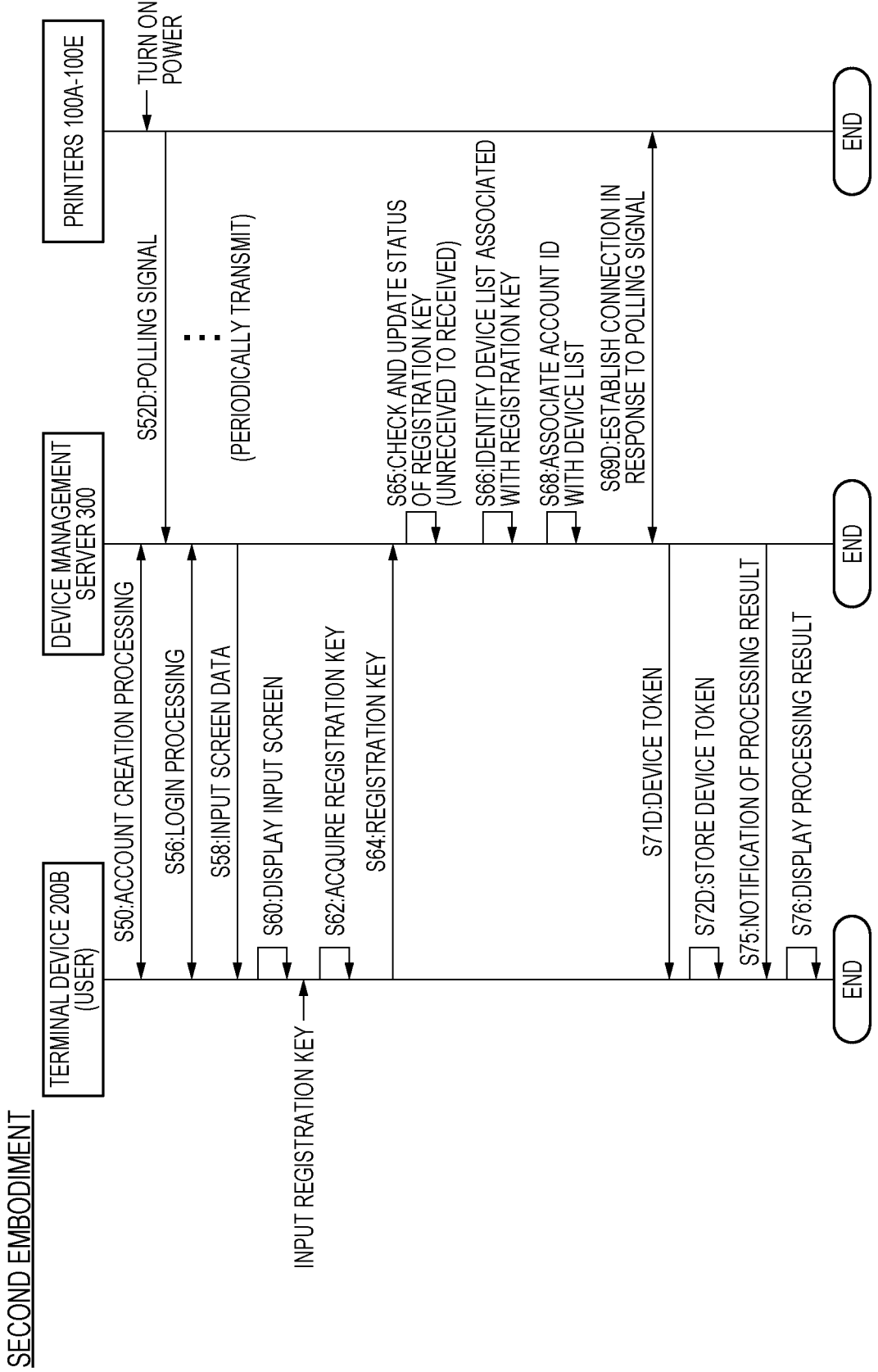

SERVER PERFORMS A REGISTRATION OPERATION FOR A PLURALITY OF PRINTERS USING PRINTER IDENTIFICATION INFORMATION, RECEIVES CORRESPONDENCE KEY INFORMATION FROM A TERMINAL DEVICE AND NON-TRANSITORY COMPUTER-READABLE STORAGE MEDIUM

REFERENCE TO RELATED APPLICATIONS

This application claims priority from Japanese Patent Application No. 2022-062158 filed on Apr. 1, 2022. The entire content of the priority application is incorporated herein by reference.

BACKGROUND ART

A related art discloses a technique for registering a plurality of printers in a server. In this technique, a user of a printer performs a registration operation for storing an issued PIN code in the plurality of printers. The printer transmits a connection request including the PIN code and a serial number of the printer to the server. If the PIN code is valid, the server registers the printer by storing the serial number and transmits a token to the printer. The registered printer can communicate with the server using the token.

However, in the above technique, since the user of the printer needs to perform a registration operation of storing the PIN code in the plurality of printers, for example, when the number of printers to be registered is large, the burden on the user may become excessively large.

DESCRIPTION

Aspects of the present disclosure provides a technique capable of reducing the burden on a user for specific processing (for example, registration processing for a plurality of printers) that is executed using a plurality of pieces of device identification information.

According to an aspect of the present disclosure, a server including: a controller configured to: receive a plurality of pieces of device identification information from a communication device, each of the plurality of pieces of device identification information indicating a device to be used for receiving a specific service; record the plurality of pieces of device identification information and one piece of correspondence information in a memory in association with each other; receive the correspondence information from a terminal device of a user; and execute, in response to the reception of the correspondence information, specific processing related to the specific service using the plurality of pieces of device identification information associated with the correspondence information.

According to the above configuration, the plurality of pieces of device identification information received from the communication device and the one piece of correspondence information are recorded in association with each other, and in response to the reception of the correspondence information from the terminal device of the user, the specific processing related to the specific service is executed using the plurality of pieces of device identification information. As a result, the user can cause the server to execute the specific processing simply by transmitting the correspondence information from the terminal device to the server. Accordingly, it is possible to reduce the burden on the user for the specific processing that is executed using the plurality of pieces of device identification information.

The technique in the present disclosure can be implemented in various forms, and can be implemented in the form of, for example, a server, a terminal device, a system including a server and a terminal device, a processing method, a computer program for implementing the functions of these devices and methods, a non-transitory computer-readable storage medium storing the computer program, or the like.

FIG. 2 is a diagram showing an example of a table.

FIGS. 4A, 4B, 4C, and 4D are diagrams showing an example of a screen displayed on the terminal device.

FIG. 5 is a first sequence diagram of second registration processing according to a first embodiment.

FIG. 6 is a second sequence diagram of the second registration processing according to the first embodiment.

FIG. 7 is a third sequence diagram of the second registration processing according to the first embodiment.

FIG. 8 is a sequence diagram of second registration processing according to a second embodiment.

A. FIRST EMBODIMENT (A-1. Configuration of System 1000)

Figure 1:
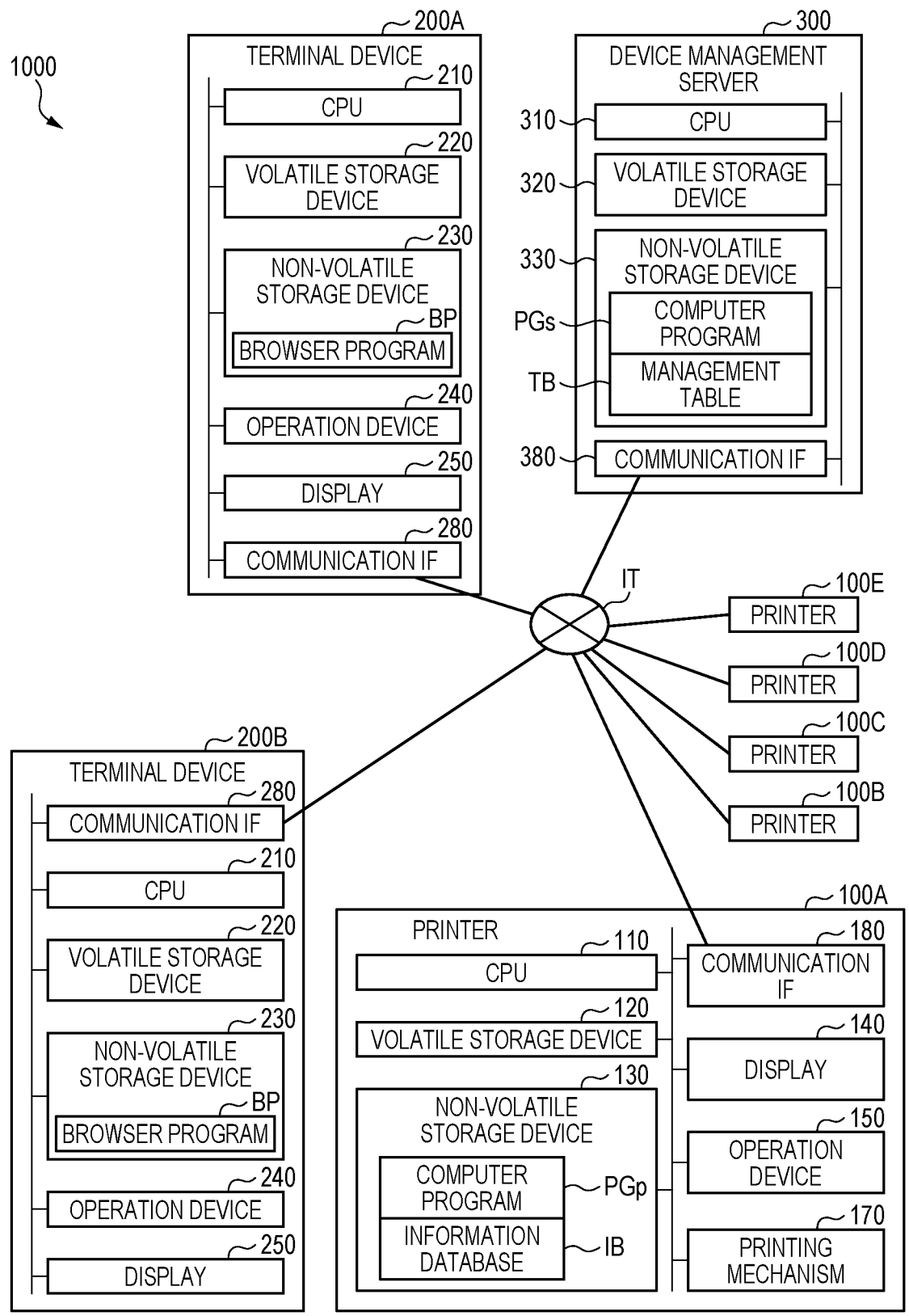
FIG. 1 is a block diagram showing a configuration of a system 1000.

FIG. 1 is a block diagram showing a configuration of a system 1000. The system 1000 includes a plurality of printers 100A to 100E, terminal devices 200A and 200B, and a device management server 300.

The printer 100A includes a CPU 110 as a controller of the printer 100A, a volatile storage device 120 such as a DRAM, and a non-volatile storage device 130 such as a hard disk or a flash memory. The printer 100A includes a display unit 140 such as a liquid crystal display that displays an image, an operation device 150 such as a button or a touch panel for acquiring a user operation, a printing mechanism 170, and a communication interface (IF) 180.

The communication IF 180 is an interface for connecting to the Internet IT, for example, a wired interface conforming to Ethernet or a wireless interface conforming to the Wi-Fi standard. Ethernet is a registered trademark of FUJIFILM Business Innovation Corp.

The CPU 110 is an arithmetic device (processor) that performs data processing. The volatile storage device 120 provides a buffer area for temporarily storing various types of intermediate data generated when the CPU 110 performs processing. The non-volatile storage device 130 stores a computer program PGp for controlling the printer 100A and an information database IB in which various types of information such as device information to be described later are recorded.

In the present embodiment, the computer program PGp is stored in advance in the non-volatile storage device 130 when the printer 100A is manufactured and provided. Alternatively, the computer program PGp may be provided, for example, in a form to be downloaded from a server connected via the Internet IT or in a form recorded in a CD-ROM or the like.

The CPU 110 executes the computer program PGp to control the printer 100A. For example, the CPU 110 controls the printing mechanism 170 and causes the printing mechanism 170 to print an image based on a user instruction. As will be described later, the CPU 110 communicates with the device management server 300 to implement services related to printing in cooperation with the device management server 300.

The printers 100B to 100E include the same components 110 to 180 (not shown) as those of the printer 100A described above. Description of configurations of the printers 100B to 100E is omitted.

The printing mechanism 170 executes printing under the control of the CPU 110. The printing mechanism 170 of the present embodiment is an ink-jet printing mechanism that prints an image on a recording medium using a plurality of types of inks (for example, four types of inks of cyan, magenta, yellow, and black) as color materials. Alternatively, the printing mechanism 170 may be an electrophotographic printing mechanism that prints an image on a recording medium using toner as a color material.

The terminal devices 200A and 200B are computers, for example, personal computers. In a modification, the terminal devices 200A and 200B may be smartphones or tablet computers. The terminal device 200A is a computer owned by a sales company selling the printers 100A to 100E. The terminal device 200B is a computer owned by a user who uses the printers 100A to 100E.

The terminal device 200A includes a CPU 210 as a controller, a volatile storage device 220 such as a DRAM, and a non-volatile storage device 230 such as a hard disk or a flash memory. The terminal device 200A includes a display 250 such as a liquid crystal display that displays an image, an operation device 240 such as a keyboard or a touch panel for acquiring a user operation, and a communication IF 280. The communication IF is an interface for connecting to the Internet IT, for example, a wired interface conforming to Ethernet or a wireless interface conforming to the Wi-Fi standard. Ethernet is the registered trademark of FUJIFILM Business Innovation Corp.

The volatile storage device 220 provides a buffer area for temporarily storing various types of intermediate data generated when the CPU 210 performs processing. The non-volatile storage device 230 stores a browser program BP.

The CPU 210 functions as a web browser by executing the browser program BP. As will be described later, the CPU 210 functioning as a web browser accesses the device management server 300 and executes processing related to the registration of the printers 100A to 100E.

The terminal device 200B includes the same components 210 to 280 as those of the terminal device 200A. Description of a configuration of the terminal device 200B is omitted.

The device management server 300 is, for example, a computer operated by a business operator who manufactures the printers 100A to 100E, for example, a cloud server.

The device management server 300 includes a CPU 310 as a controller, a volatile storage device 320 such as a DRAM, a non-volatile storage device 330 such as a hard disk or a flash memory, and a communication interface (IF) 380. The communication IF 380 is, for example, a wired interface conforming to Ethernet. Ethernet is the registered trademark of FUJIFILM Business Innovation Corp.

The CPU 310 is an arithmetic device (processor) that performs data processing. The volatile storage device 320 provides a buffer area for temporarily storing various types of intermediate data generated when the CPU 310 performs processing. The non-volatile storage device 330 stores a computer program PGs and a management table TB to be described later.

The computer program PGs of the device management server 300 is provided, for example, in a form to be uploaded by a business operator operating the device management server 300. The CPU 310 of the device management server 300 provides a service using the printers 100A to 100E by executing the computer program PGs. For example, in the present embodiment, the device management server 300 provides a management service for managing consumables (for example, an ink as a color material) of the printers 100A to 100E. In addition, as will be described later, before providing the service, the CPU 310 executes processing for registering the printers 100A to 100B which are service targets.

The device management server 300 can communicate with devices connected to the Internet IT, for example, the printers 100A to 100E and the terminal devices 200A and 200B, via the Internet IT.

Although only the five printers 100A to 100E and the two terminal devices 200A and 200B are shown in FIG. 1, the device management server 300 provides services to a plurality of users using a large number of printers. In the following, various types of processing for the terminal device 200A of a sales company, the terminal device 200B of a user, and the printers 100A to 100E of the user will be described, and the processing is executed in the same manner for another sales company, a terminal device of a user, and a printer of the user.

FIG. 2 is a diagram showing an example of a table. As shown in FIG. 2, the management table TB includes a device list LT, a registration key table KT, an account table AT, and a device registration table DT.

The device list LT is a table in which one or more pieces of device information are recorded. FIG. 2 shows three device lists LT1 to LT3. The device information includes a device ID, which is identification information for identifying a device, and printer information, such as a model name and a model number of a printer to which the device ID is assigned. In the present embodiment, the device ID is a serial number unique to a printer. For example, in the device list LT1 of FIG. 2, device IDs of the five printers 100A to 100E and printer information are recorded in association with each other. As will be described later, the device list LT is generated when the device information is received from the terminal device 200A of a sales company.

The registration key table KT is a table in which registration keys are recorded. The registration key is, for example, a randomly generated character string. In the registration key table KT, the registration key is recorded in association with the device list LT and status. The registration key is recorded when the device list LT is generated, as will be described later.

The status of the registration key is either received or unreceived. An unreceived registration key is a registration key that is not received from a terminal device (for example, the terminal device 200B) of a user after being generated. The received registration key is a registration key received from a terminal device (for example, the terminal device 200B) of a user after being generated. Processing of receiving a registration key from the terminal device 200A of a user will be described later.

The account table AT is a table in which account information is recorded for each user account. In the present embodiment, as will be described later, a user registers an account to use a service provided by the device management server 300. As shown in FIG. 2, each piece of account information includes an account ID, a password, and a user name.

In the device registration table DT, the account ID and the device list LT are recorded in association with each other.

Accordingly, an account identified by the account ID is associated with one or more printers (for example, 100A to 100E) used when a user who owns the account uses the management service.

(A-2. Registration Processing of Printer)

When using the management service provided by the device management server 300, one or more printers used for the management service are registered in advance in the device management server 300. Registration processing for this purpose will be described. The registration processing includes first registration processing executed by the terminal device 200A of a sales company and the device management server 300, and second registration processing executed by the terminal device 200B of a user and the device management server 300 after the first registration processing.

(A-2-1. First Registration Processing)

Figure 3:
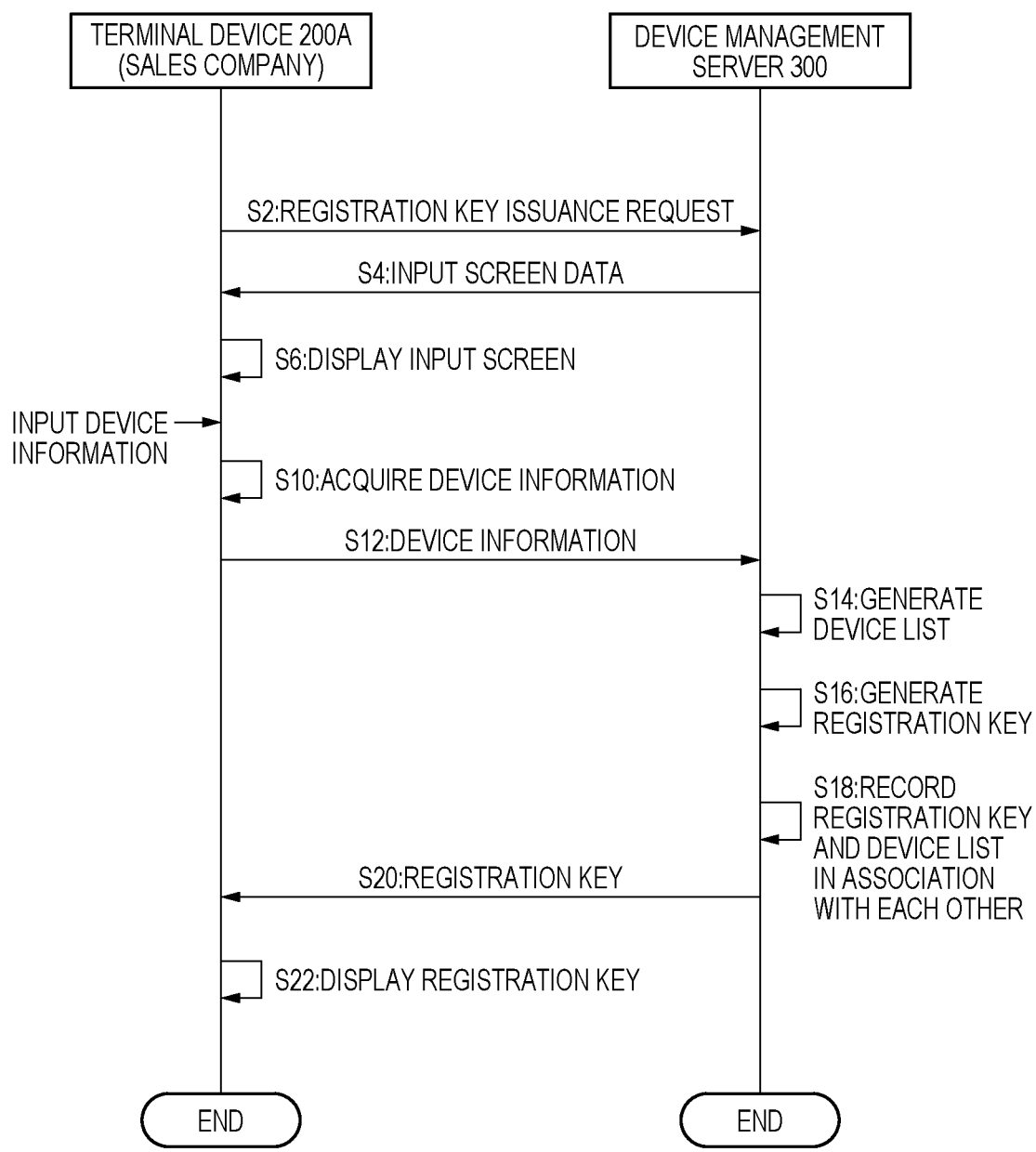
FIG. 3 is a sequence diagram of first registration processing executed by a terminal device 200A and a device management server 300.

FIG. 3 is a sequence diagram of the first registration processing executed by the terminal device 200A and the device management server 300. For example, in a case where the printers 100A to 100E are sold from a sales company to a user, the first registration processing is executed when a contract is concluded between the sales company and the user to use the management service using the printers 100A to 100E.

In S2, the terminal device 200A of a sales company transmits a registration key issuance request to the device management server 300. For example, a person in charge of the sales company operates the terminal device 200A to cause the CPU 210 of the terminal device 200A to execute the browser program BP, thereby activating a web browser. The person in charge operates the web browser to access a sales company web page (not shown) provided by the device management server 300, and performs a predetermined operation on the web page. As a result, the registration key issuance request is transmitted from the terminal device 200A to the device management server 300.

When the device management server 300 receives the registration key issuance request, in S4, the device management server 300 transmits screen data showing a device information input screen W1 for inputting device information to the terminal device 200A as a response to the registration key issuance request.

When the terminal device 200A receives the screen data, the terminal device 200A displays the device information input screen W1 on the display 250 of the terminal device 200A in S6.

FIGS. 4A, 4B, 4C, and 4D are diagrams showing an example of a screen displayed on the terminal device. The device information input screen W1 shown in FIG. 4A includes a message MS1 prompting input of device information, device information input fields BX1 and BX2, and a send button BT1. The input field BX1 is a field for inputting a device ID (for example, a serial number). The input field BX2 is a field for inputting a model name. On the device information input screen W1, information of a plurality of printers can be input. For example, the person in charge inputs information of the five printers 100A to 100E on the device information input screen W1, and then presses the send button BT1.

When the send button BT1 is pressed, the terminal device 200A acquires one or more pieces of device information (for example, device information of the five printers 100A to 100E) via the device information input screen W1 in S10. When acquiring the device information, the terminal device 200A transmits the device information to the device management server 300 in S12.

When the device management server 300 receives the device information, the device management server 300 generates a device list LT in S14. For example, a device list LT1 (FIG. 2) is generated in which information of the five printers 100A to 100E is recorded.

In step S16, the device management server 300 generates a registration key. For example, the device management server 300 randomly selects a predetermined number of alphanumeric characters to generate a registration key consisting of a predetermined number of alphanumeric characters.

In S18, the device management server 300 records the registration key generated in S16 in association with the device list LT generated in S14. For example, as shown in FIG. 2, a registration key KY_1 and the device list LT1 are recorded in the registration key table KT in association with each other. At this time, the status of the registration key is set to "unreceived", and the status is also recorded in the registration key table KT in association with the registration key.

In S20, the device management server 300 transmits the registration key generated in S16 to the terminal device 200A. The registration key is transmitted to the terminal device 200A as a response to the device information received in S12, for example.

When the terminal device 200A receives the registration key, the terminal device 200A displays the registration key on the display 140 of the terminal device 200A in S22, and ends the first registration processing. The person in charge notifies a user who uses the management service of the registration key. For example, the person in charge prints the registration key and passes the printed material to a user who purchases the printers 100A to 100E.

(A-2-2. Second Registration Processing)

FIG. 5 is a first sequence diagram of second registration processing according to the first embodiment. For example, after a sales company delivers the printers 100A to 100E to a user and the user is notified of a registration key by a person in charge of the sales company, the second registration processing is executed.

In S50, the terminal device 200B of a user communicates with the device management server 300 to execute account creation processing. For example, the user operates the terminal device 200B to cause the CPU 210 of the terminal device 200B to execute the browser program BP, thereby activating a web browser. The user operates the web browser to access a user web page (not shown) provided by the device management server 300, and performs a predetermined operation on the web page. As a result, an account creation screen (not shown) is displayed on the display 250 of the terminal device 200B. When the user inputs predetermined account information (for example, an account ID and a password) on the account creation screen, the account information is transmitted from the terminal device 200B to the device management server 300. The device management server 300 creates a new account using the account information. Specifically, the device management server 300 records new account information (an account ID, a password, and a name) in the account table AT (FIG. 2). For example, as shown in FIG. 2, an account having an account ID of "AC_a", a password of "PW_a", and a user name of "KEN" is created and recorded in the account table AT. This account creation processing may be executed at any time as long as the account creation processing is before login processing of S56.

The user sets the printers 100A to 100E in a state of being connectable to the Internet IT and turns on the printers 100A to 100E. When the printers are turned on, the printers establish a communication connection with the device management server 300 in S52. In the present embodiment, each of the printers transmits a connection request for an always-on connection according to an extensible messaging and presence protocol (XMPP) to the device management server 300 to establish the always-on connection with the device management server 300. In the example of FIG. 5, the user turns on the printers before the login processing of S56.

In S54, each of the printers transmits device information (printer information such as a device ID and a model name) thereof to the device management server 300. As a result, the device management server 300 can identify the printer with which the always-on connection is established.

In S56 thereafter, the terminal device 200B executes login processing with the device management server 300. For example, the user operates the web browser activated on the terminal device 200B to perform a predetermined operation on the user web page provided by the device management server 300. As a result, a login screen (not shown) is displayed on the display 250 of the terminal device 200B. When the user inputs an account ID and a password of his/her own account on the login screen, these pieces of account information are transmitted from the terminal device 200B to the device management server 300. If the received account information matches the account information registered in the account table AT, the device management server 300 permits the login. For example, the user logs in the device management server 300 using the account ID "AC_a" and the password "PW_a".

If no login is permitted, the processing ends at this point (not shown). If login is permitted, in S58, the device management server 300 transmits screen data showing a registration key input screen W2 for inputting a registration key to the terminal device 200B.

When the terminal device 200B receives the screen data, the terminal device 200B displays the registration key input screen W2 on the display 250 of the terminal device 200B in S60.

Figure 4A:
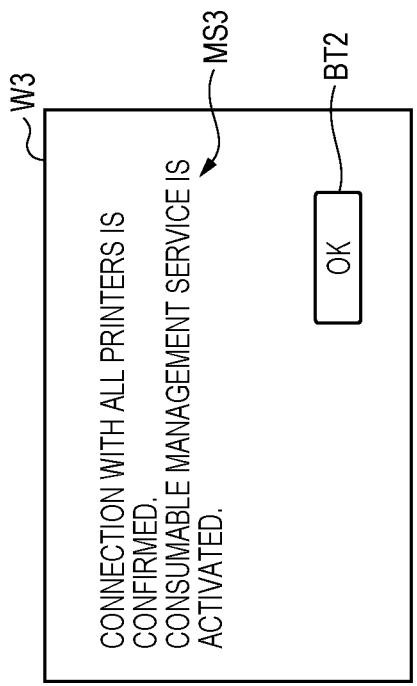
Figure 4C:
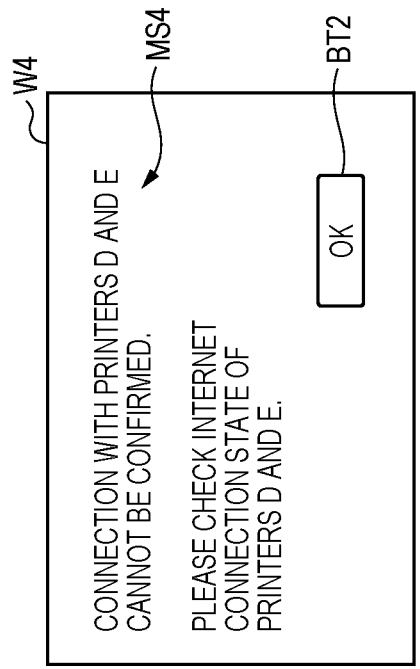
Figure 4B:
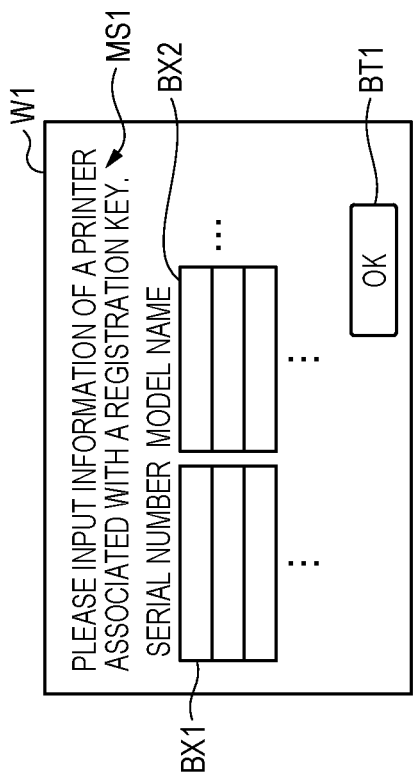

The registration key input screen W2 of FIG. 4B includes a message MS2 prompting input of a registration key, an input field BX3 for a registration key, and the send button BT1. The user inputs the registration key notified from the sales company on the registration key input screen W2 and then presses the send button BT1.

When the send button BT1 is pressed, the terminal device 200B acquires a registration key via the registration key input screen W2 in S62. In S64, the terminal device 200B transmits the acquired registration key to the device management server 300.

When the device management server 300 receives the registration key, in S65, the device management server 300 searches the registration key table KT (FIG. 2) for the received registration key and checks the status of the registration key. Since FIG. 5 is a sequence diagram when an unreceived registration key is received, the status of the registration key is "unreceived". When the status of the received registration key is unreceived, the device management server 300 updates the status of the registration key from unreceived to received.

In step S66, the device management server 300 refers to the registration key table KT to identify a device list LT associated with the registration key. For example, in the example of FIG. 2, when the received registration key is "KY_1", the device list LT1 is identified. In S68, the device management server 300 records the account ID of the login account and the device list LT associated with the registration key in the device registration table DT (FIG. 2) in association with each other. For example, in the example of FIG. 2, the registration key is recorded in association with the account ID "AC_a" and the device list LT1. As a result, the account of the user of the terminal device 200B is associated with the printers 100A to 100E. Hereinafter, printers associated with the account of the user of the terminal device 200B, that is, printers used for the management service are also referred to as "target printers".

In step S70, the device management server 300 checks the connection between the device management server 300 and the target printer associated with the account of the user of the terminal device 200B. Specifically, the printer 100A identifies a plurality of device IDs of the target printer with reference to the device list LT associated with the account ID of the user. The printer 100A checks whether the always-on connection (refer to S52 and S54 of FIG. 5) with the printers (that is, the printers 100A to 100E which are the target printers) having the device IDs is established.

In step S71, the device management server 300 transmits a device token to the target printer for which the always-on connection is confirmed. The device token is authentication information used when the target printer communicates with the device management server 300 after the management service is started, and is information that differs for each of the target printers. For example, when transmitting data to the device management server 300, the target printers add the device token to the data. The device management server 300 can recognize that a transmission target of the received data is a specific target printer by checking the device token added to the data.

When the target printer receives the device token, the target printer stores the device token in the non-volatile storage device 130 in step S72.

When transmitting the device token, the device management server 300 transmits a notification of a processing result to the terminal device 200B in S75. When the terminal device 200B receives the notification of the processing result, the terminal device 200B displays the processing result on the display 250 of the terminal device 200B in S76. For example, a display screen W3 of FIG. 4C and a display screen W4 of FIG. 4D are displayed.

The display screen W3 of FIG. 4C is displayed when connections with all the target printers are confirmed and device tokens are transmitted to all the target printers. The display screen W3 includes a message MS3 notifying that connections with all the target printers are confirmed and the management service is activated, and a confirmation button BT2.

Figure 4D:
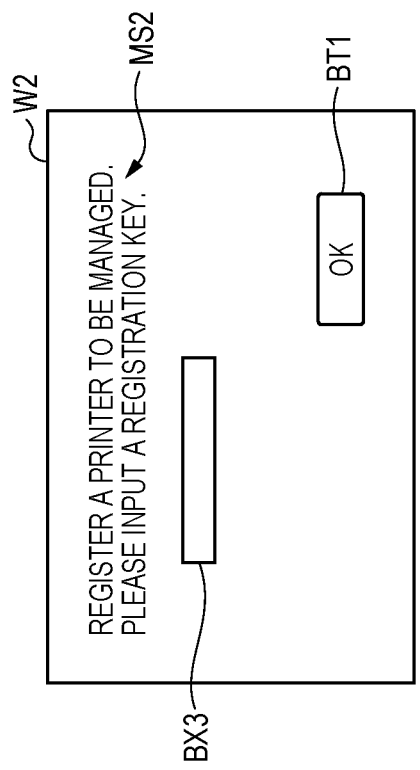

The display screen W4 of FIG. 4D is displayed when connections with some of the target printers cannot be confirmed and device tokens are not transmitted to these target printers. The display screen W4 includes a message MS4 for notifying that connections with some of the target printers are not confirmed and prompting confirmation of connection states to the Internet IT of the target printers for which the connections are not confirmed, and a confirmation button BT2.

When the confirmation button BT2 is pressed, the terminal device 200B ends the display of the processing result and ends the second registration processing.

When a device token is transmitted to at least one of the target printers by the second registration processing of FIG. 5, the management service is started between the target printer that acquires the device token and the device management server 300. For example, the target printer uses the device token to periodically (for example, once a day)

transmit information on a remaining amount of an ink to the device management server 300. The device management server 300 manages the remaining amount of the ink of the target printer based on the information on the remaining amount transmitted from the target printer. When the amount of the ink of the target printer is equal to or less than a reference amount, the device management server 300 executes delivery processing so that an ink cartridge containing the ink is delivered to the address of the user registered separately. Alternatively, the device management server 300 transmits a guide for the user to order the ink cartridge to the terminal device 200B when the amount of the ink of the target printer is equal to or less than a reference amount.

Among the target printers associated with the account of the user, there may be a target printer for which the connection cannot be confirmed. For example, when the target printer is not connected to the network or when there is an error in the network setting of the target printer, the connection of the target printer cannot be confirmed. In this case, the user can transmit the registration key again from the terminal device 200B to the device management server 300 after connecting or setting the target printer for which the connection is not confirmed to the network. Processing in this case will be described.

FIG. 6 is a second sequence diagram of the second registration processing according to the first embodiment. FIG. 6 shows an example in which the registration key is transmitted again from the terminal device 200B to the device management server 300. In S52 of FIG. 6, as in S52 of FIG. 5, an always-on connection of communication is established between the target printer that is turned on and the device management server 300. In S54 of FIG. 6, as in S54 of FIG. 5, the target printer transmits device information thereof to the device management server 300.

In S56 to S64 of FIG. 6, the same processing as S56 to S64 of FIG. 5 is executed, and the registration key is transmitted from the terminal device 200B to the device management server 300 again. When the device management server 300 receives the registration key, the device management server 300 searches the registration key table KT (FIG. 2) for the received registration key and checks the status of the registration key in S65B. FIG. 6 is a sequence diagram when a received registration key is received, and the status of the registration key is "received".

In S66 of FIG. 6, as in S66 of FIG. 5, the device management server 300 refers to the registration key table KT to identify a device list LT associated with the registration key. For example, in the example of FIG. 2, when the received registration key is "KY_1", the device list LT1 is identified.

In S68B of FIG. 6, the device management server 300 determines whether an account ID used in login processing of S56 of FIG. 6 is the same as the account ID at the first reception. Here, the account ID at the first reception means the account ID used in the login processing when the registration key received again is first received. The device list LT associated with the registration key and the account ID at the first reception are associated with each other when the registration key is first received (S68 of FIG. 5). Therefore, in the device registration table DT, the account ID associated with the device list LT identified in S66 of FIG. 6 is the account ID at the first reception. In the example of FIG. 6, in S68B, it is determined that the account ID at the first reception is the same as the account ID used in the login processing of S56 of FIG. 6.

If the account ID used in the login processing of S56 of FIG. 6 is the same as the account ID at the first reception, the same processing as S70 and S71 of FIG. 5 is performed in S70 and S71 of FIG. 6. That is, in S70 of FIG. 6, the device management server 300 confirms the always-on connection between the target printer and the device management server 300, and transmits a device token to the target printer for which the always-on connection is confirmed in S71 of FIG. 6. However, in S71 of FIG. 6, the device token is not transmitted to the target printer to which the device token is transmitted, and the device token is transmitted only to the target printer to which the device token is not transmitted.

When the target printer receives the device token, the target printer stores the device token in the non-volatile storage device 130 in S72 of FIG. 6 as in S72 of FIG. 5. In S75 of FIG. 6, the device management server 300 transmits a notification of a processing result to the terminal device 200B as in S75 of FIG. 5. In S76 of FIG. 6, as in S76 of FIG. 5, the terminal device 200B displays the processing result on the display 250 of the terminal device 200B (see FIG. 4C and FIG. 5).

When a device token is newly transmitted to at least one of the target printers by the second registration processing of FIG. 6, the management service is started between the target printer that newly acquires the device token and the device management server 300.

Next, processing in a case where, after the user transmits the registration key from the terminal device 200B to the device management server 300, a person other than the user uses another account to transmit the same registration key to the device management server 300 will be described. For example, a person who illegally obtains the registration key may transmit the registration key using another account.

FIG. 7 is a third sequence diagram of the second registration processing according to the first embodiment. FIG. 7 shows an example in which a person other than the above user transmits the registration key again to the device management server 300 from a terminal device (not shown in FIG. 1) different from the terminal device 200B.

In S56 to S64 of FIG. 7, the same processing as S56 to S64 of FIG. 5 is executed between the terminal device of the person other than the user and the device management server 300. However, the login processing in S56 of FIG. 7 is executed using an account ID and a password of an account different from the account of the user.

In S65B of FIG. 7 after the registration key is transmitted from the terminal device to the device management server 300, the device management server 300 checks the status of the registration key as in S65B of FIG. 6. FIG. 7 is a sequence diagram when a received registration key is received, and the status of the registration key is "received".

In S66 of FIG. 7, as in S66 of FIG. 6, the device management server 300 refers to the registration key table KT to identify a device list LT associated with the registration key.

In S68C of FIG. 7, the device management server 300 determines whether the account ID used in the login processing of S56 of FIG. 7 is the same as the account ID at the first reception. In the example of FIG. 7, it is determined that the account ID used in the login processing of S56 of FIG. 7 is different from the account ID at the first reception.

If the account ID used in the login processing of S56 of FIG. 7 is different from the account ID at the first reception, the device management server 300 transmits an error notification to the terminal device in S75C of FIG. 7. In S76C of FIG. 7, the error notification is displayed on a display of the terminal device.

As described above, in a case where the registration key is received again, the device management server 300 checks the connection with the target printer and transmits a device token to the target printer only when the registration key is transmitted by an owner of the account at the first reception. As a result, for example, it is possible to prevent inconveniences such as a printer being associated with an account of a specific user from being associated with another account and starting the management service against the intention of a user who is the legitimate owner of a registration key.

According to the present embodiment described above, in the first registration processing (FIG. 3), the device management server 300 receives a plurality of device IDs from the terminal device 200B of a sales company (S12 of FIG. 3). The plurality of device IDs indicate the printers 100A to 100E which are devices to be used for receiving the management service. The device management server 300 records the plurality of device IDs and one registration key in a memory (non-volatile storage device 330) in association with each other (S14 and S18 of FIG. 3). In the second registration processing (FIG. 5), the device management server 300 receives the registration key from the terminal device 200A of a user (S64 of FIG. 5). In response to the reception of the registration key, the device management server 300 executes specific processing related to the management service (for example, registration of a target printer to be used for the management service (S68 of FIG. 6)) using the device list LT including the plurality of device IDs associated with the registration key (S66 to S71). As a result, the user can cause the device management server 300 to execute the specific processing simply by transmitting the registration key from the terminal device 200A to the device management server 300. Accordingly, the burden on the user for the specific processing can be reduced.

For example, when performing specific processing such as registering a target printer in the device management server 300, it is assumed that the user inputs the device IDs to the terminal device 200A one by one. In this case, especially when the number of target printers is large, the burden of input increases. In addition, when it is necessary to input other information such as a model number in addition to the device ID, the burden of input increases. Further, in this case, erroneous input of the device ID is likely to occur, and when erroneous input occurs, the specific processing cannot be appropriately completed, and the burden on the user may be increased. In the present embodiment, the user only needs to input the registration key to the terminal device 200A, and thus erroneous input is less likely to occur, and the burden on the user is reduced.

Further, according to the present embodiment, in the first registration processing (FIG. 3), the device management server 300 generates a registration key (S16 of FIG. 3), and transmits the generated registration key to the terminal device 200B (S20 of FIG. 3). As a result, an operator of the terminal device 200B can easily acquire the registration key by simply transmitting device information such as the device ID from the terminal device 200B to the device management server 300. For example, the burden on the operator (a person in charge of a sales company in the present embodiment) of the terminal device 200B can be reduced compared to a case where the operator of the terminal device 200B creates a registration key.

Further, according to the present embodiment, the device management server 300 generates a registration key in response to the reception of the plurality of device IDs from the terminal device 200B (S12 and S20 of FIG. 3). As a result, since the registration key is generated as necessary, for example, it is not necessary to store a list of registration keys to be used in advance, and a required amount of memory can be reduced.

Further, according to the present embodiment, the device management server 300 executes establishment of establishing a communication connection with each of the printers 100A to 100E indicated by the plurality of device IDs (S52 of FIG. 5). The specific processing executed by the device management server 300 includes processing of notifying the terminal device 200A of the user of a result of the establishment (S75 of FIG. 5). As a result, the user can check the status of the communication connection between the plurality of printers 100A to 100E used for receiving the management service and the device management server 300 by transmitting the registration key to the device management server 300. Accordingly, it is possible to prevent the inconvenience of being unable to appropriately receive the management service due to communication failure between the target printer and the device management server 300.

Further, in the present embodiment, the communication connection between the device management server 300 and the target printer is an always-on connection according to XMPP. Therefore, the device management server 300 establishes a communication connection in response to a connection request from the target printer regardless of the transmission timing of the registration key. That is, in the present embodiment, the establishment of the communication connection is processing of establishing a communication connection with the target printer when the connection request is received from the target printer regardless of whether the registration key is received. As a result, for example, the target printer does not need to transmit the connection request many times, and may transmit the connection request to the device management server 300 only once at any time (at the time of power-on in the present embodiment).

Further, in the present embodiment, the specific processing executed by the device management server 300 includes processing of transmitting a device token, which is communication information for the target printer to communicate with the device management server 300, to each of the target printers. As a result, after the specific processing, the target printer can communicate with the device management server 300 to receive the management service.

Further, the device token is information used by the device management server 300 to recognize the target printer of the communication partner, so that the device token is different for each of the target printers. Therefore, it is not preferable that the device token is sent to a printer other than the target printer. In the present embodiment, since the device information to be associated with the registration key is input to the terminal device 200B by the person in charge of the sales company, it is possible to prevent erroneous input of the device information by the user, and thus it is possible to prevent the device token from being transmitted to a printer other than the target printer.

Further, in the present embodiment, the specific processing executed by the device management server 300 includes processing (S68 of FIG. 5) of recording the device list LT including the plurality of device IDs in the memory (non-volatile storage device 330) in association with a specific account indicated by account information received from the terminal device 200B. As a result, the plurality of printers 100A to 100E used by an owner of the specific account (in the present embodiment, a user of the terminal device 200B) to receive the management service can be appropriately registered.

Further, in the present embodiment, when the device management server 300 receives the registration key again after executing the second registration processing once (S64 of FIGS. 6 and 7), the device management server 300 receives the account information again from a device (the terminal device 200B of FIG. 6 or the terminal device of FIG. 7) that is a transmission target of the registration key (S56 of FIGS. 6 and 7). The device management server 300 determines whether an account indicated by the account information received again is the specific account at the first reception (S68B of FIGS. 6 and S68C of FIG. 7). If the account indicated by the account information received again is the specific account at the first reception (S68B of FIG. 6), the device management server 300 executes processing related to the management service (S70 and S71 of FIG. 6). If the account indicated by the account information received again is different from the specific account at the first reception (S68C of FIG. 7), the device management server 300 does not execute processing related to the management service. As a result, it is possible to prevent one registration key from being used by a person other than the user. Accordingly, for example, it is possible to prevent the processing related to the management service from being executed against the intention of the user.

As can be seen from the above description, the registration key of the present embodiment is an example of correspondence information, the terminal device 200A of the present embodiment is an example of a communication device, and the terminal device 200B is an example of a terminal device of a user.

B. SECOND EMBODIMENT

In a second embodiment, in communication between a target printer and the device management server 300, a connection (for example, HTTP connection) established for each communication is used instead of an always-on connection.

In the first embodiment, the device management server 300 provides a management service, but in the second embodiment, the device management server 300 provides a print service instead of the management service. In the print service, the terminal device 200B of a user transmits an image file to be printed and a device token indicating a target printer to be used for printing to the device management server 300. The device management server 300 generates a print job using the image file, and transmits the print job to the target printer indicated by the device token. The target printer prints an image using the print job. By using the print service, the terminal device 200B can cause the target printer to print an image without performing the processing of generating a print job based on an image file. Therefore, even if a printer driver is not installed in the terminal device 200B, the terminal device 200B can cause the target printer to print an image.

As described above, in the print service, the terminal device 200B of a user uses a device token, and in the second embodiment, the device token is transmitted to the terminal device 200B, as will be described later.

FIG. 8 is a sequence diagram of second registration processing according to the second embodiment. In the second embodiment, when the target printer is turned on, the target printer periodically (for example, every several seconds to one minute) transmits a polling signal (connection request) (S52D of FIG. 8).

The processing of S50 of FIG. 8 and the processing of S56 to S68 of FIG. 8 are the same as the processing of the same reference numerals of FIG. 5. In S69D after S68 of FIG. 8, the polling signal is periodically transmitted from the target printer. In step S69D of FIG. 8, since the device list LT corresponding to a registration key is identified (S66 of FIG. 8), the device management server 300 can identify the target printer with reference to a device ID. In S69D, when the device management server 300 recognizes that the polling signal is received from the target printer based on the device ID included in the polling signal, the device management server 300 establishes a communication connection with the target printer in response to the polling signal from the target printer. Accordingly, the device management server 300 can confirm the communication connection with the target printer.

In S71D, the device management server 300 transmits a device token to the terminal device 200B. One or more device tokens are transmitted, each indicating a target printer whose communication connection with the device management server 300 is confirmed.

When the terminal device 200B receives the device token, the terminal device 200B stores the device token in the non-volatile storage device 230 in S72D. As described above, the device token is used to specify the target printer to be used for printing when the terminal device 200B transmits the image file to the device management server 300 after the print service is started.

In S75 of FIG. 8, as in S75 of FIG. 5, the device management server 300 transmits a notification of a processing result to the terminal device 200B. In S76 of FIG. 8, as in S76 of FIG. 5, the terminal device 200B displays the processing result on the display 250 of the terminal device 200B (see FIGS. 4C and 5).

According to the second embodiment described above, the processing of establishing communication between the device management server 300 and the target printer is processing of establishing a communication connection with the target printer when a connection request (specifically, a polling signal) is received from the target printer after the registration key is received. As a result, after the registration key is received, since it is sufficient to establish communication with a printer confirmed to be the target printer by the device ID, it is possible to prevent unnecessary communication processing from being performed.

Further, according to the second embodiment, the specific processing executed by the device management server 300 includes processing of transmitting a device token, which is communication information for designating any one of the target printers to communicate with the device management server 300, to the terminal device 200B (S71D of FIG. 8). As a result, for example, after the specific processing, the terminal device 200B can communicate with the device management server 300 to receive the print service using the target printer.

C. MODIFICATION (1) In the first registration processing of the above embodiments, the device management server 300 generates a registration key and transmits the registration key to the terminal device 200A of a sales company (S14 and S20 of FIG. 3). Alternatively, the terminal device 200A may generate the registration key automatically or based on an input of a person in charge of the sales company, and transmit the registration key to the device management server 300 together with device information in S12 of FIG. 3. In this case, the device management server 300 may record the received registration key and the device list LT in which the received printer information is recorded in association with each other.

(2) In the first registration processing of the above embodiments, the device management server 300 generates a registration key in response to the reception of device information from the terminal device 200A (S12 and S14 of FIG. 3). Alternatively, for example, the device management server 300 may store a list of a plurality of registration keys in advance, and may randomly or sequentially select one registration key to be used from the list in response to the reception of the device information from the terminal device 200A.

(3) In the second registration processing of the above embodiments, the specific processing executed by the device management server 300 includes processing of associating an account of a user with a target printer (S68 of FIG. 5), processing of checking a communication connection with the target printer and notifying a confirmed result (S70 and S75 of FIG. 5), and processing of transmitting a device token (S71 of FIG. 5). The specific processing is not limited to the processing, and may include various types of processing related to services to be provided. For example, the specific processing may include processing of installing, in a target printer, an application program for causing the target printer to execute processing to be executed for a service or processing of notifying that a service is started after the service is activated, in addition to the processing exemplified in each of the embodiments or instead of the processing exemplified in each of the embodiments.

(4) In the above embodiments, when the device management server 300 receives the registration key again, the device management server 300 executes the processing related to the management service only in a case where an account subjected to login processing when the registration key is received again is the account at the first reception. Alternatively, when the device management server 300 receives the registration key again, the device management server 300 does not execute the processing related to the management service, and may execute the processing related to the management service only when the registration key is received for the first time.

(5) In the above embodiments, the device management server 300 for a service provided using the printers 100A to 100E has been described as an example. Servers for services using other devices, not limited to services using printers, may be adopted instead of the device management server 300 of the present embodiments. As the service using another device, for example, a service in which another device (for example, an electric appliance such as a monitoring camera or a cookware) set in a home, an office, or the like is remotely operated using a terminal device (terminal application) may be adopted. In addition, a server that receives a measurement result from a device that measures various physical quantities such as temperature, humidity, weight, and length, and provides a service using the measurement result may be adopted instead of the device management server 300 of the present embodiments.

(6) In the above embodiments, although the device token is different communication information for each of the target printers, instead of this, communication information common to the plurality of target printers may be used. In this case, for example, the target printer may add the communication information and a device ID to the information to be transmitted (for example, information on a remaining amount of an ink) and transmit the information to the device management server 300. In this case, the device management server 300 identifies the target printer that is a transmission target based on the added device ID.

(7) In the above embodiments, the processing performed by the device management server 300 may be shared and executed by a plurality of servers. For example, a plurality of servers including a server that manages the account table AT and performs the login processing and a server that manages the registration key table KT and the device list LT may execute the processing executed by the device management server 300 in cooperation with each other. In this case, the plurality of servers correspond to the server in the claims.

(8) In the above embodiments, part of configurations implemented by hardware may be replaced with software, or part or all configurations implemented by software may be replaced with hardware.

Although the present disclosure has been described based on the embodiments and the modifications, the embodiments of the present disclosure described above are intended to facilitate the understanding of the present disclosure and are not intended to limit the present disclosure. The present disclosure can be changed and improved without departing from the gist and the scope of claims thereof, and the present disclosure includes equivalents thereof

What is claimed is:

1. A server comprising:
a controller configured to:
    receive a plurality of pieces of device identification information from a communication device, each of the plurality of pieces of device identification information indicating a device to be used for receiving a specific service;
    record the plurality of pieces of device identification information and one piece of correspondence information in a memory in association with each other;
    receive the correspondence information from a terminal device of a user;
    receive account information from the terminal device; and
    execute, in response to the reception of the correspondence information, specific processing related to the specific service using the plurality of pieces of device identification information associated with the correspondence information;
wherein the specific processing includes processing of recording the plurality of pieces of device identification information in a memory in association with a specific account indicated by the account information;
wherein when the controller receives the correspondence information again after the specific processing, the controller receives the account information again from a device that is a transmission target of the correspondence information,
wherein the controller is further configured to determine whether an account indicated by the account information received again is the specific account, and
the specific processing executes processing related to the specific service when the account indicated by the account information received again is the specific account, and does not execute the processing related to the specific service when the account indicated by the account information received again is different from the specific account.

2. The server according to claim 1,
wherein the controller is further configured to
    generate the correspondence information, and transmit the generated correspondence information to the communication device.

3. The server according to claim 2, wherein the controller is configured to generate the correspondence information in response to the reception of the plurality of pieces of device identification information from the communication device by the controller.

4. The server according to claim 1, wherein the controller is further configured to execute establishment of establishing a communication connection with each of the devices indicated by the plurality of pieces of device identification information, and
wherein the specific processing includes processing of notifying the terminal device of a result of the establishment.

5. The server according to claim 4, wherein the establishment is processing of establishing a communication connection with the device when a connection request is received from the device after the correspondence information is received.

6. The server according to claim 4, wherein the establishment is processing of establishing a communication connection with the device when a connection request is received from the device regardless of whether the correspondence information is received.

7. The server according to claim 1, wherein the specific processing includes processing of transmitting, to each of the devices indicated by the plurality of pieces of device identification information, communication information for the device to communicate with the server.

8. The server according to claim 7, wherein the communication information is different for each of the devices as transmission targets.

9. The server according to claim 1, wherein the specific processing includes processing of transmitting, to the terminal device, communication information for designating any one of the devices indicated by the plurality of pieces of device identification information to communicate with the server.

10. A non-transitory computer-readable storage medium storing a computer program, when executed by a computer of a server, causing the sever to perform:
receiving a plurality of pieces of device identification information from a communication device, each of the plurality of pieces of device identification information indicating a device to be used for receiving a specific service;
recording the plurality of pieces of device identification information and one piece of correspondence information in a memory in association with each other;
receiving the correspondence information from a terminal device of a user;
receiving account information from the terminal device; and
specific processing related to the specific service using the plurality of pieces of device identification information associated with the correspondence information, in response to the reception of the correspondence information;
wherein the specific processing includes processing of recording the plurality of pieces of device identification information in a memory in association with a specific account indicated by the account information;
wherein when receiving the correspondence information again after the specific processing, receiving the account information again from a device that is a transmission target of the correspondence information, and determining whether an account indicated by the account information received again is the specific account, and
wherein the specific processing executes the processing related to the specific service when the account indicated by the account information received again is the specific account, and does not execute the processing related to the specific service when the account indicated by the account information received again is different from the specific account.

* * * * *